United States Patent

Wiseley et al.

[15] 3,688,056

[45] Aug. 29, 1972

[54] MAGNETIC TRANSDUCER HEADS

[72] Inventors: Thomas D. Wiseley, Concord; Roy Rallis, Burlington, both of Mass.

[73] Assignee: Honeywell Inc., Minneapolis, Minn.

[22] Filed: May 21, 1970

[21] Appl. No.: 39,251

[52] U.S. Cl. ..............................179/100.2 C, 29/603

[51] Int. Cl. ............................G11b 5/14, G11b 5/42

[58] Field of Search ..................29/603; 179/100.2 C; 340/174.1 F; 346/74 MC

[56] References Cited

UNITED STATES PATENTS

| | | | |
|---|---|---|---|
| 3,283,396 | 11/1966 | Pfost | 29/603 |
| 3,514,768 | 5/1970 | Hagadorn et al. | 179/100.2 X |
| 3,375,575 | 4/1968 | Visser et al. | 29/603 |
| 3,145,452 | 8/1964 | Camras | 29/603 |
| 3,145,453 | 8/1964 | Duinker et al. | 29/603 |
| 3,246,383 | 4/1966 | Peloschek et al. | 29/603 |
| 3,354,540 | 11/1967 | Duinker | 29/603 |
| 3,458,926 | 8/1969 | Maissel et al. | 29/603 |
| 3,494,026 | 2/1970 | Sugaya | 29/603 |
| 3,499,214 | 3/1970 | Schneider | 29/603 |

*Primary Examiner*—Eugene G. Botz
*Assistant Examiner*—Jerry Smith
*Attorney*—Fred Jacob and Ronald T. Reiling

[57] ABSTRACT

A high frequency ferrite magnetic transducer head sliced from a profiled glass bonded assembly contains a non-magnetic conductive spacer material uniformly disposed throughout the recording gap forming area.

15 Claims, 3 Drawing Figures

INVENTORS
THOMAS D. WISELEY
ROY RALLIS
BY Leo Stanger
ATTORNEY

MAGNETIC TRANSDUCER HEADS

BACKGROUND OF THE INVENTION

This invention relates to magnetic transducer heads for reading, writing, and/or erasing magnetic recordings. More specifically, the invention relates to ferrite transducer heads composed of individual parts bonded together and having spacer material uniformly disposed throughout the recording gap, and to methods of manufacturing such heads.

Such heads comprise at least two bonded portions of sintered oxidic ferro-magnetic material which are separated by a very short operative gap filled with non-magnetic material which may also bond the circuit ferro-magnetic parts together. The heads are often sliced from an elongated preformed and assembled block. In one known manufacturing method that uses such an assembled block, an elongated gap is created by forming a space between two elongated and channel shaped ferro-magnetic parts. A quantity of glass or enamel in the form of grains, powder or a coherent rod or plate is placed adjacent to or in the resulting gap or gaps between the elongated parts to form the block. The melting point of the glass or enamel is not higher than 900°C. Then the assembly is heated to the melting temperature of the glass or enamel and subsequently cooled. The whole block thus formed is cut transverse to the long direction into a number of heads each with a gap having the desired width. To form the space, this method requires the use of spacers between the parts at both ends of the elongated parts. The spacers accurately space the parts from each other. The spacer may be made for example of metal foil, glass foil, or mica. In the case of magnetic heads intended for high density recordings, the thickness of the spacers is on the order of 1 to 3 microns (40–120 micro-inches). Here, the necessary pressure applied during the epoxy or glass bonding operation causes a bowing in the center of the elongated assembly between the spacers. This produces non-uniform gap width along the length of the assembly. Thus, large portions of the potential transducer producing assembly are rendered unusable.

The prior art also shows the use of a continuous elongated spacer disposed uniformly through the front part of the gap forming area. The spacer containing portion of the gap is later cut or milled away. This leaves a gap area filled entirely with glass or epoxy.

By placing a layer of epoxy or glass material between the two gap forming mating surfaces, without spacers, and carefully controlling conditions of temperature and pressure, a predetermined gap width may be obtained. However this technique is difficult to apply in actual manufacturing use because of the difficulties of precisely controlling the variables involved.

Another technique uses spacers distributed at intervals along the length of the mating surfaces with the spacer supported sections of the resultant assembly later eliminated. This causes excessive waste of the accurately machined profile.

The prior art shows the use of glass as the sole material in the gap area of the resultant head structure. Air bubbles within the glass in the gap area are often formed during the manufacturing operation. These bubbles weaken the total structure. In addition, if during the final polishing operations a bubble is reached at the pole tip surfaces, the adjacent ferrite material will crumble and the resulting imprecise gap will render the head unusable.

It is an object of the present invention to overcome the foregoing problems and disadvantages.

It is a further object of the present invention to provide an improved method of making a profiled ferrite assembly from which individual or multiple transducer head units may be severed.

It is another object of the invention to produce a resulting magnetic transducer head having improved performance characteristics.

SUMMARY OF THE INVENTION

According to a feature of the invention, the foregoing problems are solved and the above objects realized by disposing a non-magnetic conductive spacer material uniformly in the entire gap forming area and glass bonding it to the ferrite. The individual head structures then contain the conductive spacer material as an integral part thereof.

According to another feature of the invention, the non-magnetic conductive spacer material uniformly fills the gap and extends slightly into the adjacent channel.

According to yet another feature of the invention, the conductive spacer material is Havar.

The spacer material, instead of being considered superfluous, is used as an integral part of the structure and lends the structure advantages. Specifically, the conductive spacer material, when the head is electrically driven, has introduced therein eddy currents which enhance the fringing field of the gap.

According to specific features of the invention, profiled parts of ferrite material with carefully formed and finished mating surfaces are prepared. A strip of non-magnetic conductive spacer material, such as Havar, is placed between the gap forming surfaces of the profiled ferrite parts prior to the positioning of the parts in a support fixture which clamps the assembly. The spacer material extends completely throughout the gap forming area and into the adjacent channel. The spacer material is carefully aligned in order that it does not extend too far into the channel.

More specifically, according to other features of the invention, a suitable bonding agent, such as powdered glass in an appropriate vehicle is introduced onto the channel surface adjacent the gap forming surfaces to be bonded together. After preheating at 300°F., and upon heating to between 900°F., and 1,500°F., preferably 950°F., to 1,200°, and most preferably about 1,000°F., a wetting action occurs causing the now melted glass to flow towards the surfaces to be bonded. Upon reaching the contiguous ferrite and spacer surfaces, the melted glass is pulled in by capillary action and completely bonds the spacer material to the ferrite. In addition, rear mating surfaces without spacer material have similarly been bonded together by the heating of a quantity of the powdered glass agent applied adjacent to the rear mating surfaces. The powdered glass agent can either be applied before the parts are inserted in the support fixture or after by the use of a hypodermic needle.

According to other features of the invention, the assembled profiled pieces with spacer insert, glass powder agent, and support fixture are placed in an oven and heated to about 1,000°F after being preheated to 300°F. After oven cooling, individual heads are sliced from the bonded profiled pieces and finished with lapping and polishing operations.

These and other features of the invention are pointed out in the claims. The foregoing summary will become clear and additional modifications will suggest themselves from the following detailed description when read in light of the accompanying drawings.

DETAILED DESCRIPTION OF THE PREFERRED EMBODIMENT

Figures 1, 2:
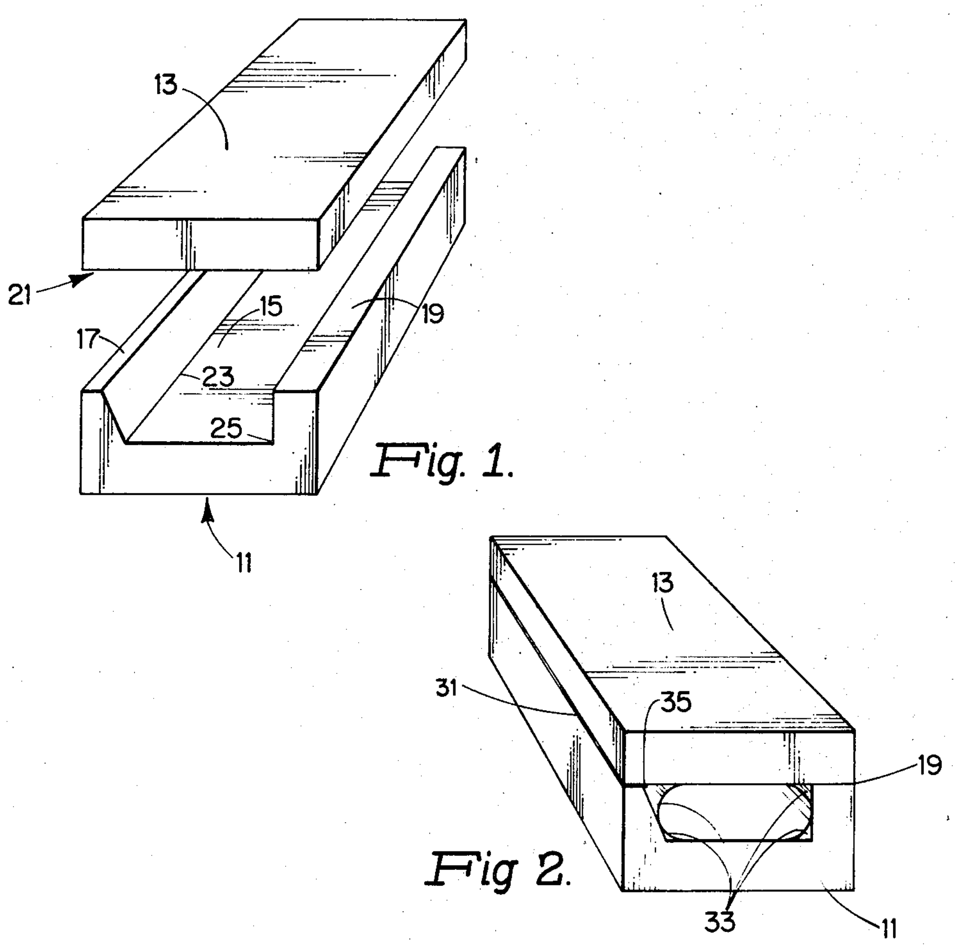
FIG. 1 is an elevation drawing of the ferrite parts.
FIG. 2 is an elevation drawing of the completed assembly after heating.

FIG. 1 shows the profiled parts 11 and 13 machined from a block of ferrite material. The original ferrite material is usually formed by mixing very fine powders of metallic oxides, predominently iron, zinc, and manganese. After the powders are mixed, they are pressed into a solid block under high pressure then heated to a very high temperature. Following this pressing and fusing operation the ferrite is a very hard ceramic solid.

This material is very hard and also quite brittle. Any machining operations must be done with diamond grinding wheels at very low stock removal rates to prevent shattering. Normal feed rate when cutting ferrite is less than one half inch per minute.

The part 11 is formed from a precut slab of ferrite with dimensions 0.092 × 0.175× 1.5 inch. The part 11 is then ground with a shaped diamond grinding wheel to form the channel 15 which will accomodate the wire excitation windings needed in a finished individual core (See FIG. 4). Gap forming mating surface 17 is wider than the desired final thickness so that individual heads can be lapped and polished to their final dimensions when mounted in a pad structure for later attachment to the head support apparatus of a piece of equipment such as a magnetic disk drive or tape unit. Rear mating surface 19 produces the back support for the assembly.

The part 13 is a lapped ferrite slab of dimensions 0.047 × 0.175 × 1.5 inch. The mating surfaces of each block, i.e. the gap forming surface 17 and rear mating surface 19 of part 11, and surface 21 of part 13 are finely polished with a diamond slurry to substantially an optical flatness for mating purposes. The lapping operations may be performed on conventional lapping machines and the resulting parts may then be hand-polished on a flat granite plate with an appropriate slurry.

Following the satisfactory polishing of the parts 11 and 13, they must be bonded into assemblies having a very accurately controlled gap width. By the use of a non-magnetic metallic foil as a spacer, a very accurate gap width over the length of the assembly can be maintained. In addition, the conductive nature of the spacer material will provide an improved fringing field for magnetic recording in the final head structure. A greater fringing field is obtained because the eddy currents induced in the conductive spacer oppose the passage of the primary magnetic field through the gap area containing the spacer. The spacer may be a foil ribbon with a thickness of about 2 microns and a width of about 100 mils. A suitable material is a cobalt alloy known as Havar manufactured by the Precision Metals Division of Hamilton Watch Company of Lancaster, Pennsylvania.

The spacer material is positioned over gap forming surface 17. Then surface 21 of part 13 is carefully placed over part 11 and the positioned spacer material. A glass bonding agent may be applied in the form of glass powder in a nitrocellulose binder thinned with amyl acetate. The powdered glass agent may be applied along edges 23 and 25. The bonding operation is then performed by placing the two parts 11 and 13 with the inserted non-magnetic conductive spacer material and glass bonding agent into a support fixture which can clamp the parts and spacer material together during the high temperature bonding operation. By preheating the assembly to 300°F, for about 20 minutes, the amyl acetate solvent is evaporated. Upon heating to about 1,000°F, the nitrocellulose binder will decompose and the glass powder will melt. Then, by a "wetting" action, the molten glass will flow upwards to surfaces 17 and 19. Next, the molten glass will be drawn by capillary action so as to bond surface 19 directly to surface 21 and to bond surface 17 to one side of the conductive spaces and surface 21 to the other side of the conductive spacer. The resulting glass bonding layers in the gap forming area are very thin and do not have bubbles.

The powdered glass agent may be applied to edges 23 and 25 of part 11 either by means of a brush or eye-dropper before bringing the parts together or by means of a hypodermic needle after placement in the support fixture. The ferrite parts are bonded directly together at the contiguous portion of surface 19 and surface 21 and the ferrite is bonded to the conductive spacer material at surface 17 and the opposing portion of surface 21. To do this, the glass bonding agent is first preheated to about 250° to 500°F and preferably to 300°F. The preheating to 300°F. and subsequent heating to 1,000°F may be done in an electric furnace.

While the furnace temperature of 1,000°F is the preferred bonding temperature, temperatures between 950°F and 1,200°F are also suitable. The limits of the acceptable temperature range depend upon the type of glass used. The lower acceptable limit is the temperature about 900°F, when the glass will not "wet" the ferrite parts and flow towards the mating surfaces. The upper limit is about 1,500°F, when the glass will react chemically with the ferrite forming an undesired compound. After heating at 1,000°F for half an hour, the furnace or oven is allowed to cool down for 10 hours and the bonded assembly in its support fixture is removed.

The bonded assembly has the appearance shown in FIG. 2. Parts 11 and 13 have been bonded together using glass as the bonding agent with a 2 micron thick Havar spacer 31 shown in the gap forming area where the Havar both produces a uniform gap width and will later produce improved magnetic head performance as an integral part of an individual head.

Some excess solidified glass 33 can be seen remaining in the channel area. The Havar spacer 31 has an edge 35 projecting into the excess channel area glass 33. The Havar spacer 31 projects about 10 mils into the channel area to produce a resulting ferrite, Havar, and glass assembly of improved structural integrity. In addition, the eddy currents in the spacer oppose the fringing field in the channel area thereby enhancing the fringing field from the recording surface. Although both the ferrite parts and the glass bonding material have nearly identical temperature coefficients, the Havar spacer has a temperature coefficient that is different from the glass ferrite. If the Havar spacer extends beyond the glass 33 in the channel, then the resulting glass and Havar junction exhibits structural stress points and the differing temperature expansion coefficients of the glass and Havar may cause cracks to form in the glass.

Figure 3:
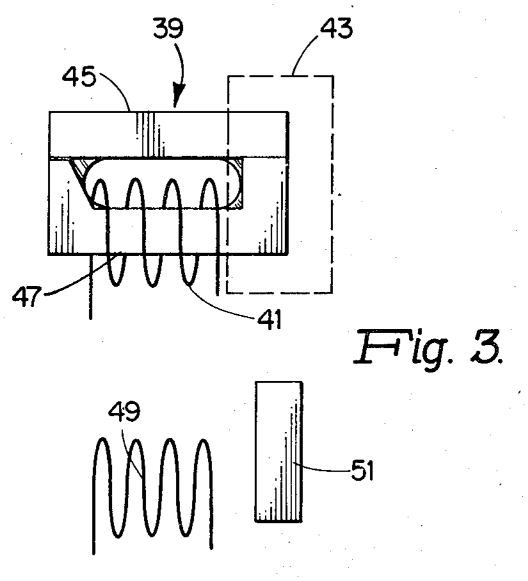
FIG. 3 is an elevation drawing of an individual head with an excitation coil.

After heating, the now bonded assembly is oven cooled for about 10 hours and then lapped and polished in order that the gap width may be microscopically examined. Upon apparent visual verification of proper bonding, the now polished assembly is sliced into individual cores by a diamond cutoff wheel or by a plurality of spaced wires and a diamond slurry as is well-known in the art. The resulting thickness of an individual sliced head 39, as shown in FIG. 3, must be great enough so that the head may again be lapped and polished to eliminate the scratches incurred during the slicing operation.

After the post-slicing lapping and polishing operation, the ferrite heads are visually examined and those passing this examination are hand-wound with bifilar turns of number 44 wire to form a coil 41 for excitation purposes. Alternatively, coil 41 could be provided by the removal of rear section 43 and a pre-wound coil 49 slid over remaining side piece 45 and 47 and a ferrite bar 51 then bonded to the side pieces 45 and 47 to replace section 43. The head 39 and coil assembly 41 are attached to an external "erasing" structure and are placed in a support pad. The support pad and head are lapped and polished together to produce the final structure useful for incorporation in magnetic recording equipment.

The conductive foil spacer 31 allows a very accurate gap width to be maintained between the ferrite parts 11 and 13 over an extended length which allows a long high yield bonded profile to be created. This conductive spacer material which is glass bonded to the adjacent ferrite surfaces improves magnetic head performance by enhancing the useful fringing magnetic field during magnetic recording operations.

Another suitable spacer material, similar to Havar, is Elgiloy, a cobalt base high-strength alloy manufactured by the Elgin National Watch Company of Elgin, Ill. Both Havar and Elgiloy come in ribbon-like rolls and may be obtained in the two micron thickness range which is necessary for modern high-frequency recording.

From the foregoing discussion, it will be apparent that numerous modifications, departures, substitutions, and equivalences may now occur to those skilled in the art, all of which fall within the true scope and spirit of the present invention.

What is claimed is:

1. In a magnetic transducer head, a magnetic gap comprising:

at least two ferrite gap forming surfaces;

a non-magnetic conductive spacer having at least two opposing surfaces, each opposing surface oriented opposite a respective one of said ferrite gap forming surfaces and in spaced relation therewith; and, a glass bonding agent interposed in the space between each opposing surface of the non-magnetic conductor spacer and a respective one of said ferrite gap forming surfaces so as to bond said non-magnetic conductive spacer to said ferrite gap forming surfaces.

2. The magnetic head of claim 1 wherein said non-magnetic conductive spacer comprises Havar.

3. A method of constructing a magnetic gap for magnetic transducing devices comprising the steps of:

forming a first ferrite member to produce a first gap forming surface;

forming a second member of ferrite to produce a second gap forming surface;

assembling the first and second ferrite members so as to position said first and second gap forming surfaces in opposing relationship to each other to thereby form a gap;

inserting a non-magnetic conductive spacer within the gap so as to lie between the first and second gap forming surfaces;

orienting the non-magnetic conductive spacer within the gap so as to substantially fill the entire gap;

introducing a molten glass bonding agent in the vicinity of the non-magnetic conductive spacer filled gap;

wetting the gap area so as to cause the molten glass to flow between the non-magnetic conductive spacer and the first and second gap forming surfaces; and cooling the gap area so as to harden the glass bonding agent between the non-magnetic spacers and the first and second gap forming surfaces so as to thereby form a glass bond between the non-magnetic spacer and the first and second gap forming surfaces.

4. The method of claim 3 wherein said step of wetting the gap area comprises the steps of:

wetting the surfaces of the non-magnetic conductive spacer which oppose the first and second gap forming surfaces; and wetting the first and second gap forming surfaces; and wherein said method further comprises the step of:

filling the spaces which exist between the resultingly wetted surfaces with molten glass.

5. The method of claim 4 wherein said heating step furthermore comprises:

heating the glass bonding agent under pressure to a temperature within the range of 950° to 1,200°F.

6. The method of claim 5 wherein said cooling step furthermore comprises:

cooling the gap area over a period of approximately ten hours.

7. The method of claim 6 wherein the non-magnetic conductive spacer comprises Havar.

8. The method of claim 6 wherein the spacer extends beyond the gap defined by the gap forming surfaces.

9. The method of claim 6 additionally comprising the step of:

slicing the assembled first and second ferrite members to form individual magnetic transducing devices.

10. In a magnetic core assembly, having a transducing gap formed therein consisting of a pair of first and second forming surfaces;

a method of filling the transducing gap comprising the steps of;

inserting a non-magnetic conductive spacer within the gap so as to lie between the first and second gap forming surfaces;

orienting the non-magnetic spacer within the gap so as to substantially fill the entire gap;

introducing a molten glass bonding agent in the vicinity of the non-magnetic conductive spacer filled gap;

wetting the gap area so as to cause the molten glass to flow between the non-magnetic conductive spacer and the first and second gap forming surfaces; and cooling the gap area so as to harden the glass bonding agent between the non-magnetic conductive spacer and the first and second gap forming surfaces so as to thereby form a glass bond between the non-magnetic spacers and the gap forming surfaces.

11. The method of claim 10 wherein said step of wetting the gap area comprises the steps of:

wetting the surfaces of the non-magnetic conductive spacer which oppose the first and second gap forming surfaces; and wetting the first and second gap forming surfaces; and wherein said method further comprises the step of:

filling the spaces which exist between the resultingly wetted surfaces with molten glass.

12. The method of claim 11 wherein said heating step furthermore comprises:

heating the glass bonding agent under pressure to a temperature within the range of 950° to 1,200°F.

13. The method of claim 12 wherein said cooling step furthermore comprises:

cooling the gap area over a period of approximately ten hours.

14. The method of claim 13 wherein the non-magnetic conductive spacer comprises Havar.

15. The method of claim 14 wherein the spacer extends beyond the gap defined by the gap forming surfaces.

* * * * *